United States Patent [19]

Mollenauer

[11] Patent Number: 4,881,790

[45] Date of Patent: Nov. 21, 1989

[54] OPTICAL COMMUNICATIONS SYSTEM COMPRISING RAMAN AMPLIFICATION MEANS

[75] Inventor: Linn F. Mollenauer, Colts Neck, N.J.

[73] Assignee: American Telephone and Telegraph Company, AT&T Bell Laboratories, Murray Hill, N.J.

[21] Appl. No.: 185,573

[22] Filed: Apr. 25, 1988

[51] Int. Cl.$^4$ .............................................. G02B 6/28
[52] U.S. Cl. ............................. 350/96.16; 350/96.29; 455/612
[58] Field of Search ............... 350/96.15, 96.16, 96.18, 350/96.19, 96.29, 96.3, 96.31, 96.34; 455/610, 612; 370/1, 3

[56] References Cited

U.S. PATENT DOCUMENTS

| | | | |
|---|---|---|---|
| 4,616,898 | 10/1986 | Hicks, Jr. ......................... | 350/96.15 |
| 4,699,452 | 10/1987 | Mollenauer et al. .............. | 350/96.16 |
| 4,741,587 | 5/1988 | Jewell et al. ...................... | 350/96.15 |
| 4,786,140 | 11/1988 | Melman et al. ................... | 350/96.29 |
| 4,790,619 | 12/1988 | Lines et al. ....................... | 350/96.16 |

OTHER PUBLICATIONS

*Optical Fiber Telecommunications,* Chapter 5, pp. 125-150, by Rogers H. Stolen, 1979.
*Proceedings of IEEE,* vol. 68, No. 10, Oct., 1980, "Nonlinearity in Fiber Transmission" By Rogers H. Stolen, pp. 1232-1236.
*Electronics Letters,* vol. 18, No. 22, Oct. 28, 1982, "Raman Application At 1.118 μm in Single-Mode Fibre and Its Limitation By Brillouin Scattering", by G. A. Koepf et al, pp. 942-943.
*Applied Optics,* vol. 23, No. 19, 1 Oct. 1984, "Numerical Study of Optical Soliton Transmission Amplified Periodically by the Stimulated Raman process", by A. Hasegawa, pp. 3302-3309.
*Optics Letters,* vol. 8, No. 12, Dec 1983, "Amplification and reshaping of optical solitons in a glass fiber-IV: Use of the stimulated Raman process", by A. Hasegawa, pp. 650-652.
*Optics Letters,* vol. 10, No. 5, May 1985, "Experimental Demonstration of soliton propagation in long fibers: loss compensated by Raman gain", by L. F. Mollenauer et al., pp. 229-231.
*Applied Optics,* vol. 18, No. 13, 1 Jul. 1979, "Polarization Optics of Twisted Single-Mode Fibers", by R. Ulrich et al., p. 2241-2251.
*Trans of IECE of Japan,* vol. E68, No. 1, 1 Jan. 1985, "Polarization Characteristics in Twisted Single-Mode Optical Fibers", by J. Sakai et al., pp. 7-13.
*SPIE,* vol. 841, (Fiber Optics Networks & Coherent Technology In Fiber Optics System II), 1987, "A study of the polarization properties of AT&T's rectangular polarization-maintaining fiber", by M. W. Shute, Sr., et al., pp. 358-366.

*Primary Examiner*—John D. Lee
*Attorney, Agent, or Firm*—Gregory C. Ranieri

[57] ABSTRACT

An optical fiber communications system with Raman amplification of the signal radiation comprises a broadband pump radiation source, or, preferably, a multiplicity of pump radiation sources and polarization maintaining optical fiber as the transmission medium. The sources are selected to result in a pump radiation spectrum having individual spectral components such that pump radiation intensity for each spectral component in the desired polarization in the fiber core is less than a critical intensity $I_c$. In particular, the average intensity of pump radiation in a first spectral interval, centered on any wavelength $\lambda_p$ in the pump radiation spectrum and of width equal to the Brillouin line width of the fiber at $\lambda_p$, is to be less than that average intensity in the first spectral interval that results in conversion of 10% of the radiation in the first spectral interval to stimulated Brillouin radiation. Use of a multiplicity of pump sources not only can reduce pump noise and pump depletion due to stimulated Brillouin scattering, but typically also can result in enhanced system reliability and lower cost. In a preferred embodiment, the invention in a soliton fiber communications system, with pump radiation injected at one or more intermediate fiber locations.

13 Claims, 3 Drawing Sheets

OPTICAL COMMUNICATIONS SYSTEM COMPRISING RAMAN AMPLIFICATION MEANS

TECHNICAL FIELD

This invention pertains to the field of optical communications. In particular, it pertains to fiber communications systems comprising Raman amplification means.

BACKGROUND OF THE INVENTION

Currently used long haul optical fiber communications systems typically require signal regenerators. Such devices detect the optical signal, produce a corresponding electronic signal which is amplified, reshaped and, typically, retimed, and then used to drive an appropriate radiation source, thereby producing a fresh optical pulse that is injected into the fiber. However, it has been known for some time that it is possible to amplify, and, under appropriate conditions even reshape, optical pulses without use of electronic regenerators of the type referred to above. In particular, it has been recognized that the Raman effect may be used to amplify optical signals. See, for instance, R. H. Stolen, *Proceedings of the IEEE*, Vol. 68, No. 10 (1980), pp. 1232-1236, incorporated herein by reference.

Although Raman amplification is possible in fibers other than silica-based (i.e., containing at least 50% by weight, typically >80% by weight, $SiO_2$) optical fibers, for the sake of concreteness, the exposition below will frequently refer to, and use material constants appropriate for, silica-based fiber. Such fibers have two loss minima in the approximate range 1.2-1.6 $\mu$m, and therefore communications systems that use silica-based fiber frequently use signal radiation whose wavelength lies in that range.

Stimulated Raman Scattering (SRS) is known to produce substantial gain in fused silica for frequency shifts in the range from about 100 to about 600 $cm^{-1}$, with the maximum gain occurring for a frequency shift of about 450 $cm^{-1}$. This means that, in silica-based optical fiber, radiation of wavelengths $\lambda_O$ (to be termed the signal radiation) can be amplified by means of pump radiation that is down-shifted in wavelength from $\lambda_O$ by amounts corresponding to shifts in wave number by about 100 to 600 $cm^{-1}$. For instance, for signal radiation of 1.56 $\mu$m, the appropriate pump radiation would have a wavelength between about 1.43 and 1.54 $\mu$m, with peak amplification taking place for pump radiation of about 1.46 $\mu$m. It is also known that there is no inherent threshold power for amplification by SRS, although, in order for usable amplification to take place, a substantial amount of pump power, typically more than 10 mW has to be injected into the fiber, due to the relative smallness of the Raman gain coefficient, which is of the order of $10^{-11}$ cm/watt in fused silica. For instance, in order to achieve a gain of 0.3 dB/km for 1.56 $\mu$m signal radiation in a single mode silica-based fiber of core area of 25 $(\mu m)^2$, pump power of the order of 100 mW is required, if the pump wavelength is about 1.46 $\mu$m.

It is also known that Stimulated Brillouin Scattering (SBS) can take place in optical fibers, and that such scattering can have a deleterious effect on systems performance, due principally to the fact that SBS can cause severe fluctuations in the pump intensity, which cause corresponding fluctuations in the Raman gain and to the fact that SBS can result in pump depletion. See, for instance, R.H. Stolen, op.cit. SBS can have a peak gain that is several hundred times that for SRS, per unit frequency of pump radiation, but SBS linewidths are typically very narrow, e.g., of the order of 20 MHz.

G. A. Koepf et al, *Electronics Letters*, Vol. 18(22), 1982, pp. 942-943, report on Raman amplification at 1.118 $\mu$m in single mode fiber and its limitation by SBS. They observed a deleterious effect of SBS on the Raman gain and suggest, inter alia, that an increase in the spectral width of the pump laser by modulation to values larger than the Brillouin linewidth would cause a decrease of the SBS gain and could be used for suppression of Brillouin scattering. See also E. P. Ippen and R. H. Stolen, *Applied Physics Letters*, Vol. 21(11), pp. 539-541 (1972), which reports on the observation of SBS in optical fiber.

D. Cotter, *Electronics Letters*, Vol. 18(15), 1982, pp. 638-640, discloses a technique for suppression of SBS during transmission of high power narrowband laser light in monomode fibers. The technique involves imposition of phase modulation on the optical field launched into the fiber so as to reduce the SBS gain. This is achieved, for instance, by placing between the laser and the fiber a periodically driven optical phase modulator, or by using a mode-beating effect produced when the radiation field comprises two discrete but closely spaced optical frequencies. This, it is suggested, could be achieved by using two single-frequency lasers operating at slightly different wavelengths, or perhaps more easily by using a single laser which is arranged to operate in two longitudinal modes. This principle was applied by J. Hegarty et al, *Electronics Letters*, Vol. 21(7) 1985, pp. 290-292, who used a laser operating in two modes separated by 2 GHz.

Although SRS can be used to amplify "linear" pulses, i.e., pulses in which no particular relationship between pulse peak power and pulse peak width is required, amplification by SRS can be advantageously used in soliton communications systems. A. Hasegawa et al have shown (*Applied Physics Letters*, Vol. 23(3), pp. 142-144 (1973)) that under certain conditions shape-maintaining pulses can exist in single mode optical fiber. Such pulses are termed solitons, and, in silica-based fiber, typically have center wavelengths in the range 1.45-1.60 $\mu$m. The existance of solitons has been experimentally demonstrated (L. F. Mollenauer et al, *Physical Review Letters*, Vol. 45(13), pp. 1095-1098 (1980)), and their utility for high capacity communications systems has been disclosed (U.S. Pat. No. 4,406,516, issued Sept. 27, 1983 to A. Hasegawa, co-assigned with this). Furthermore, it has been found that solitons can be amplified nonelectronically without loss of soliton character (see A. Hasegawa, *Optics Letters*, Vol. 8, pp. 650-652 (1983), incorporated herein by reference). Co-assigned U.S. Pat. No. 4,558,921 discloses a soliton optical communications system comprising nonelectronic means for increasing the pulse height and decreasing the pulse width of soliton pulses. See also A. Hasegawa, *Applied Optics*, Vol. 23(19), pp. 3302-3309 (1984) incorporated herein by reference. This coupling between pulse height and pulse width is an attribute of solitons, and its existence has been experimentally verified in single mode fiber, with loss compensated by Raman gain. (L. F. Mollenauer et al, *Optics Letters*, Vol. 10, pp. 229-231 (1985).)

Since Raman amplification of signal pulses in fiber communications systems, especially in soliton systems, potentially has substantial advantages over pulse regeneration as currently practiced, a Raman amplification scheme that, among other advantages, avoids the introduction of significant amounts of SBS-caused pump noise yet is easily and inexpensively implemented would be of considerable interest. Co-assigned U.S. Pat. No. 4,699,452 entitled "Optical Communication System Comprising Raman Amplification Means" discloses such a system.

For all optical, soliton based, long distance transmission systems such as the one disclosed in the '452 patent, it has been established that Raman gain depends upon the relative polarization of the pump signal and the transmitted signals in the fiber. Unfortunately, it has been discovered by me experimentally that the dispersion associated with birefringence in ordinary optical fibers such as those suggested in the '452 patent is not of sufficient magnitude to cause a thorough averaging of the relative polarization. As a result, system gain tends to fluctuate nondeterministically with temperature, fiber twist, and other disturbances. A related and, perhaps, even more significant result of this problematic discovery is that the dispersion of birefringence, also known as polarization dispersion, limits the ultimate transmission speed in the system if left uncorrected.

SUMMARY OF THE INVENTION

The deleterious effects of dispersion of birefringence or polarization dispersion are overcome in an optical fiber communications system in accordance with the principles of the present invention both by utilizing polarization maintaining optical fibers as the transmission medium and by employing Raman amplification of the signal radiation in the polarization maintaining fibers with a broadband pump radiation source, or, preferably, a multiplicity of pump radiation sources. The sources are selected to result in a pump radiation spectrum having individual spectral components such that pump radiation intensity for each spectral component in the desired polarization in the fiber core is less than a critical intensity $I_c$. In particular, the average intensity of pump radiation in a first spectral interval, centered on any wavelength $\lambda_p$ in the pump radiation spectrum and of width equal to the Brillouin line width of the fiber at $\lambda_p$, is to be less than that average intensity in the first spectral interval that results in conversion of 10% of the radiation in the first spectral interval to stimulated Brillouin radiation. Use of multiplicity of pump sources not only can reduce pump noise and pump depletion due to stimulated Brillouin scattering, but typically also can result in enhanced system reliability and lower cost.

In a preferred embodiment, the invention is a soliton fiber communications system, with pump radiation injected at one or more intermediate polarization maintaining fiber locations.

BRIEF DESCRIPTION OF THE DRAWING

A more complete understanding of the invention may be obtained by reading the following description of specific illustrative embodiments of the invention in conjunction with the appended drawing in which.

The same reference numerals are used to identify analogous features in different figures.

DETAILED DESCRIPTION

Figure 1:
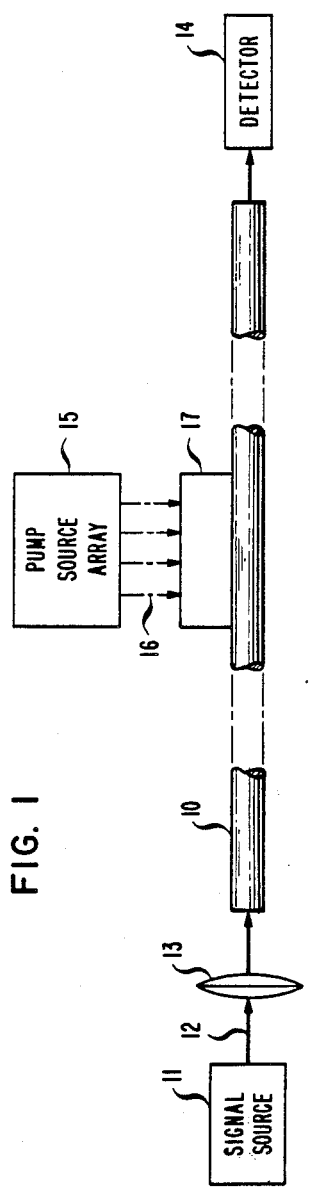
FIG. 1 schematically depicts a communications system according to the principles of the invention.

A fiberguide communications system according to the invention comprises a broadband source of pump radiation, or preferably, a multiplicity of sources of pump radiation, with source characteristics such as center wavelengths and spectral widths chosen such that the pump radiation intensity in the fiber core of a polarization maintaining fiber (optical fiber comprises a core of relatively higher refractive index, and, contactingly surrounding the core, a cladding of relatively lower refractive index) at any given wavelength does not exceed a critical value, to be defined below. The multiplicity of pump radiation sources can comprise discrete sources, e.g., discrete semiconductor lasers, gas lasers, or other sources of coherent or noncoherent radiation, or an array of devices integrated on a chip.

In a currently preferred embodiment, the sources are discrete semiconductor lasers. It will be appreciated that a combination of discrete and integrated sources can also be used, or that more than one source-carrying chip may be used. Furthermore, it is understood that in long-haul communications systems, including soliton systems, pump radiation is frequently injected into the fiber at a multiplicity of fiber locations. The appropriate spacing between adjacent injection points (in essence, a repeater spacing) depends on the characteristics of the communications system and can be determined by known methods (see, for instance, A. Hasegawa, *Applied Optics*, Vol. 23, pp. 3202-3309).

Use of a multiplicity of pump sources according to the invention not only can essentially eliminate SBS-caused pump noise but also results in enhanced system reliability and, possibly, lower capital cost. Reliability is enhanced since failure of one, or even several, pump sources in a system according to the invention need not result in impaired system performance. The remaining sources can simply be run at higher output power to make up for the failed sources. Also, low power sources often have a longer lifetime than high power sources.

It is important to the practice of this invention to employ polarization maintaining fiber. The term "polarization maintaining" is understood to comprise also those fibers commonly referred to as "polarization preserving" and the like. See U.S. Pat. Nos. 4,179,189 and 4,274,854 for examples of polarization maintaining fibers and methods of making same.

Since the principles of the invention are applicable to various types of polarization such as linear or circular polarization, various types of optical fiber may be employed. For example, the term "polarization maintaining optical fiber" is intended to comprise elliptical fibers, fibers formed after preform squashing, spun fibers, circular core fibers employing a single chirality twist or employing sequential sections of alternating chirality twist, and the like.

An optical fiber tends to preserve a certain state of polarization when it strongly differentiates via propagation constant between a desired polarization and its orthogonal counterpart. The strong differentiation reduces the ability of defects to cause intermodal scattering. Elliptical and other similar fibers exhibit a strong and constant linear birefringence which tends to preserve one or the other of two orthogonal polarizations. Twisted fibers are typically weakly birefringent and the twist or shear stress induces a large optical activity or strong differentiation between left and right circular polarizations. See R. Ulrich et al., *App. Opt.*, 18, p, 2241 (1979) and J. Sakai et al., *Trans. IECE of Japan*, E68, p. 7 (1985).

Except where specifically noted, the term "polarization" is intended to include all types of polarization possible for optical communication systems. Typically, however, there are only two cases of interest, namely, linear polarization and circular polarization. It is to be understood that the problem of introducing circularly polarized light into a polarization maintaining fiber through wavelength dependent directional couplers may be overcome by using λ/4 fiber loops before and after the coupler to accomplish a circular-to-linear polarization transformation and the a linear-to-circular polarization transformation.

An exemplary communications system according to the invention is schematically depicted in FIG. 1, wherein 10 is a polarization maintaining optical fiber, 11 is a source of electromagnetic radiation 12(of wavelength $\lambda_O$, the signal radiation), 13 refers to means for coupling radiation 12 into the polarization maintaining fiber, and 14 to means for detecting signal radiation, e.g., a photodetector. Furthermore, 15 refers to the array of pump radiation sources, 16 to the totality of pump radiation emitted by all active sources of 15, and 17 to means for coupling the pump radiation into the polarization maintaining fiber. Such well-known parts of a communications system as drive electronics, detector electronics, splices, attenuators, output means, etc., are not shown in FIG. 1. Furthermore, in a soliton system according to the invention one typically provides means for monitoring and adjusting the pump power and/or the signal power such that the signal pulses remain solitons throughout their transmission through the fiber link. Also, polarizers, polarization sensitive couplers, and polarization converters (linear to circular and the like) are typically used in the light sources and coupling means for polarized optical communication. Such elements and means are considered to be conventional and have been omitted from the FIGS.

As is known to those skilled in the art, the pump radiation can be injected into the polarization maintaining fiber such that it is co-propagating or counterpropagating with the signal radiation, or it can be injected such that a portion co-propagates whereas the remainder counter-propagates. Typically, the signal radiation is in pulse form, and the pump radiation can be either CW or pulsed. Use of pulsed pump radiation is frequently not advantageous with co-propagating signal pulses.

While the elimination of the influence of polarization dispersion is a major objective of the present invention, a secondary objective is amplification of the signal radiation by means of SRS without introduction of significant noise power due to SBS. In systems according to the invention, the pump power is spread over a spectral region such that the intensity of pump radiation at any given wavelength $\lambda_p$ in the fiber core is less than $I_c$, the critical intensity for SBS at that wavelength.

For purposes of this application, $I_c$ is defined as average radiation intensity in the core of an optical fiber (in the spectral interval that is centered at a wavelength $\lambda_p$ and that is equal in width to the Brillouin linewidth in the fiber at $\lambda_p$) that results in conversion of 10% of the radiation in the spectral interval to stimulated Brillouin radiation.

The "Brillouin linewidth" associated with an optical fiber is the FWHM (full width at half maximum) of the Brillouin spontaneous scattering spectrum in the fiber, as determined with a narrow line source of radiation. A line source is "narrow" if the source line width is much less than the Brillouin linewidth.

As an example, in an optical fiber having a pure, or lightly germaniadoped, fused silica core, the Brillouin linewidth of 1.46 μm pump radiation is about 18 MHz. If the fiber is single mode fiber with an 8 μm core diameter and a loss of about 0.2 dB/km, $I_c \sim 0.04$ mW/(μm)$^2$. This implies that the pump power in any 18 MHz wide spectral region at about 1.46 μm is not to exceed about 2 mW.

The radiation intensity I in a single mode fiber is related to the radiation power P as follows:

$$I = PA_{eff}^{-1},$$

where $A_{eff}$ is the effective core area. A method for calculating $A_{eff}$ can be found in *Optical Fiber Telecommunications*, S. E. Miller and A. G. Chynoweth, editors, Academic Press, 1979, pp. 127–135, especially page 130. However, the thus calculated value of $A_{eff}$ typically is sufficiently close to the core area size of a single mode fiber such that for most purposes it is permissible to substitute the value of the core area A for $A_{eff}$.

Figure 2:
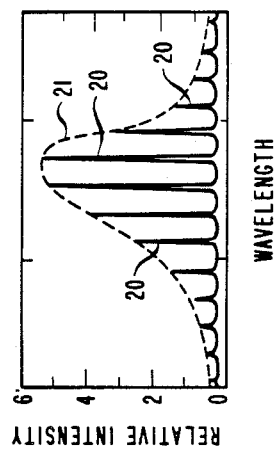
FIG. 2 is an exemplary spectrum of a semiconductor laser.

Although light-emitting diodes and other sources of non-coherent radiation can, in principle, be used in the practice of the invention, we currently consider semiconductor lasers to be preferred sources of pump radiation. As is well known, semiconductor lasers typically have a multi-line emission spectrum, as exemplified in FIG. 2. Each relatively narrow peak 20 is associated with a longitudinal mode of the laser. The mode spacing depends on the laser design, especially the resonator length and the refractive index of the active region, and frequently is of the order 0.1 nm. FIG. 2 also shows the envelope 21 of the emission spectrum.

The intensity envelope of the output of a radiation source can be used to characterize the source output. In particular, the center wavelength and spectral width of a source are herein defined as the wavelength corresponding to the maximum in the intensity envelope and as the full width at half maximum of the intensity envelope, respectively. Semiconductor lasers without mode locking typically have spectral widths of the order of 5 cm$^{-1}$, or equivalently, about 1 nm at λ=1.5 μm. Furthermore, in such lasers, the linewidth of a single radiation mode, although narrow, is typically much greater than the Brillouin linewidth. In accordance with our teaching that the pump radiation is to have a finite spectral width such that the above stated intensity criterion is met at all wavelengths, it may be advantageous to use lasers having a large number of lasing modes and/or having relatively broad emission modes.

In fused silica, the peak of the Raman gain coefficient is about 200 cm$^{-1}$ wide (with the region of gain being much wider, of the order of 500 cm$^{-1}$). Thus, the pump sources can be chosen such that their center frequencies are distributed over a spectral region including all or part of the peakwidth, possibly even including all or part of the region of significant gain outside of the peakwidth. If, for instance, $\lambda_O = 1.5$ μm, and if ten pump radiation sources are to be used, the sources could be selected such that the center frequencies are distributed more or less evenly over the wavelength region between about 1.44 μm and about 1.48 μm. The center frequencies thus would differ by about 4 nm, and there would be substantially no overlap of the source spectra. However, it is not necessary that sources be spaced such as to avoid overlap since even if the envelopes of two or more sources overlap, the probability that some mode lines overlap is relatively small. Additionally, if two or more mode lines overlap, the above-specified intensity criterion is typically easily met because the intensity in a spectral range equal to a Brillouin linewidth in a mode line is typically only a small part of the critical intensity in systems designed in accordance with the principles of this invention.

It is of interest to note that pump lasers of the type discussed above emit polarized light. The emitted polarization can be adjusted to conform to be the same as the desired mode for the polarization preserving fiber. In such a case, signals transmitted from a source are always amplified to net unity gain, for example, so that signals in the desired polarization experience no effective loss on average as they propagate down the polarization maintaining fiber. Interestingly, signals in the polarization maintaining fiber but not in the desired polarization experience no Raman gain. That is, the undesired polarization signals (i.e., orthogonal to the desired polarization) undergo full passive dissipation loss of the polarization maintaining fiber. Hence, the combination of Raman gain mechanisms with periodically controlled polarization maintenance permits long distance transmission of a desired polarization signal.

At this point, it is important to understand the way in which the combination of polarization maintenance and an active gain mechanism cooperate in the present invention. The following brief description will explicate these points through a simple model. Consider a polarization maintaining fiber with loss rate $\alpha$/km tending to preserve polarization mode $P_1$, and let Raman gain from periodically injected pump light ($P_1$ polarized) maintain the signal intensity in that polarization mode at $\sim I_1$ independently of z. Let the rate of scattering into the orthogonal mode $P_2$ be h per km. Then the equation governing the intensity of light in the mode $P_2$ is:

$$\frac{dI_2}{dz} = hI_1 - \alpha I_2$$

After traversing the polarization maintaining fiber for a while (several times $1/\alpha$) the two polarization components will come to equilibrium, where one has $$\frac{I_2}{I_1} = \frac{h}{\alpha}$$

Thus, as long as $h << \alpha$, a substantial fraction of the light will remain in the mode $P_1$. In practice, one might have h=0.002/km and $\alpha$=0.05/km. Then, from the latter equation above, $I_2/I_1$=0.04.

Light from mode $P_2$ will be scattered back into $P_1$ at a rate $hI_2=(h^2/\alpha)I_1$. Although the rate can be very small ($8 \times 1 - ^{+5}I_1$/km, using the typical numbers given above), nevertheless, because of the unity gain in the $P_1$ mode, light scattered back from the $P_2$ mode will accumulate; it can become comparable to the original $I_1$ itself in a distance $\alpha/h^2$. Again, for the typical numbers given above, that distance would be 12,500 km. Thus, for sections of polarization maintaining fiber of just a few thousand kilometers length, back scattering would probably not be a serious problem in any event. But, for long fiber paths, the crucial question is whether or not, or to what extent, the back scattered light could become reincorporated into the original signal pulses.

There are two possible ways (which might be used singly or in combination) to overcome the dispersion between the main pulses and the back scattered light. First, it would be fairly easy to periodically exchange the identity of the fast and slow modes, such that the average dispersion between the modes would be nearly zero. We note long fibers are always made by fusing together shorter segments; thus, where linear polarization is to be preserved, one could simply orient the fast axes at right angles to each other at each fusion joint. In the case where circular polarization is to be preserved, one could simply periodically reverse the sense of fiber twist. In any event, the light scattered back into the main mode would then never fall behind or run ahead of (the center of) the main pulse by more than a few picoseconds, and hence would tend to remain well attached to pulses of a few tens of picoseconds width. Second, where the pulses in the main mode are solitons (this is the only possibility in very long fibers), matters may be helped greatly by a tendency of the solitons, by way of the nonlinear properties of the fiber, to constantly attract and thereby reincorporate the low intensity light scattered back from the $P_2$ mode.

Figure 3:
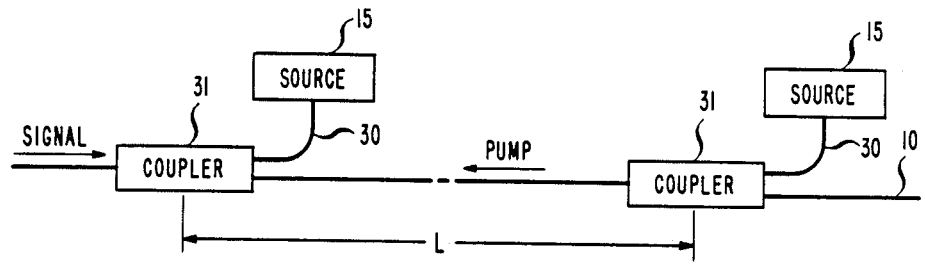
FIGS. 3-6 schematically indicate exemplary Raman amplification schemes.
Figure 4:
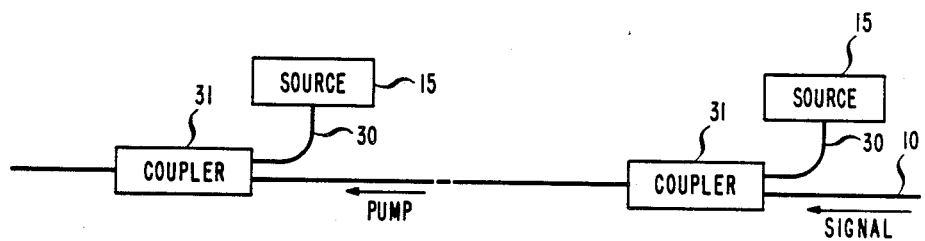
Figure 5:
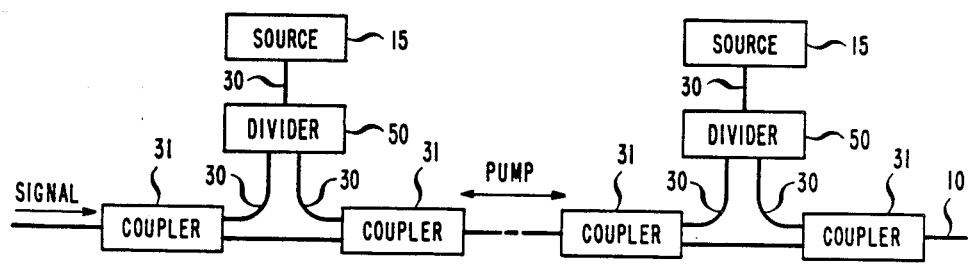
Figure 6:
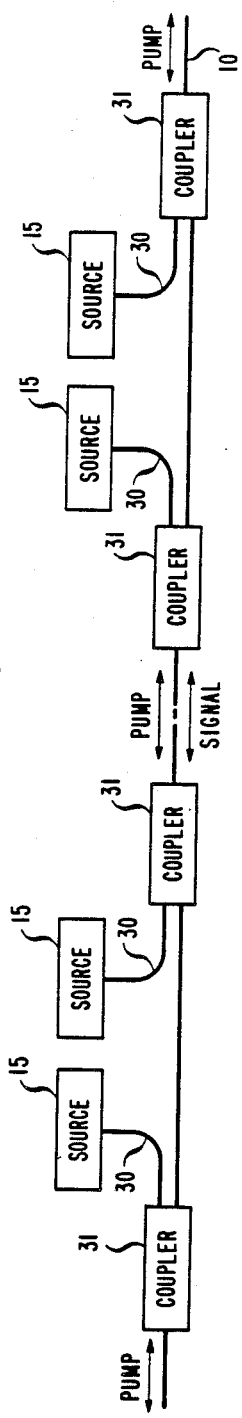

Various exemplary schemes for practicing the invention are schematically indicated in FIGS. 3-6. FIG. 3 shows an optical fiber 10 carrying optical signals in one direction, and pump radiation in the opposite direction, whereas otherwise identical FIG. 4 shows co-propagating signal and pump radiation. FIGS. 5 and 6, on the other hand, show polarization maintaining optical fiber carrying pump radiation in both directions, with FIG. 5 showing dividers 50 for splitting the pump radiation, and FIG. 6 illustrating the use of separate pump sources. FIG. 5 also indicates a unidirectional signal stream, whereas FIG. 6 shows bidirectional signal streams. It will be appreciated that the illustrated systems are exemplary only, and that other schemes are also possible. In FIGS. 3-6, reference numeral 15 refers to an aggregate of pump sources, and 30 to polarization maintaining optical fiber serving to guide the pump radiation to a coupler 31, (and, in FIG. 5, to a splitter 50). Coupler 31 serves to couple pump radiation onto the transmission fiber without coupling out significant amounts of signal radiation.

Figure 7:
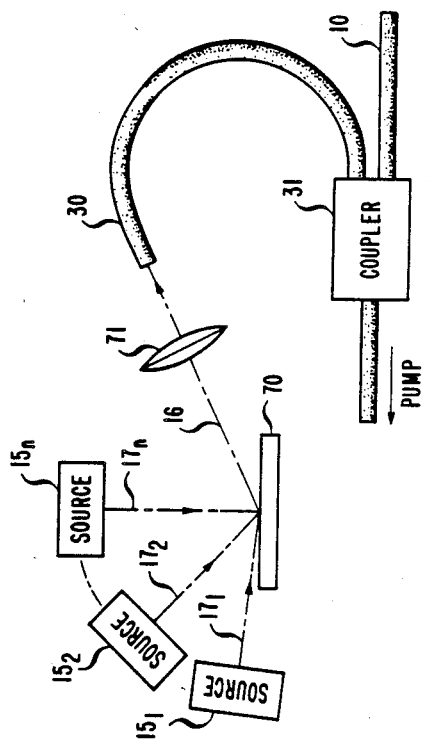

A system according to the invention typically also requires means for coupling the outputs of the battery of pump sources onto polarization maintaining fiber 30. Exemplary means for achieving this are schematically depicted in FIG. 7, in which $15_1$, $15_2$, ... $15n$ indicate n sources of pump radiation $17_1$, $17_2$, ... $17n$, respectively. The n beams of pump radiation are directed onto the surface of optical grating 70. The grating serves to combine the n individual beams into single beam 16 which is coupled into polarization maintaining fiber 30 by appropriate coupling means 71.

Figure 8:
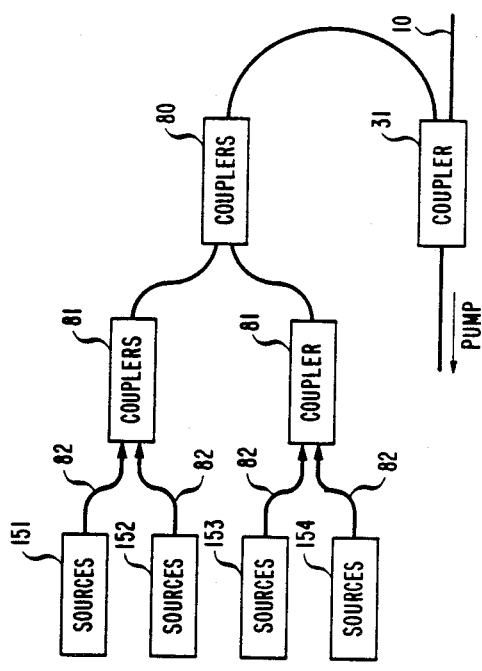
FIGS. 7 and 8 schematically illustrate exemplary techniques for coupling pump radiation into an optical fiber.

Other ways for coupling the output of two or more pump sources onto a single polarization maintaining fiber, without causing interaction between the sources, are known. For instance, long taper fused fiber couplers can be used. Another exemplary scheme is schematically depicted in FIG. 8, in which 151-154 refers to four (out of a battery of n) individual pump sources that emit polarized radiation, with, for instance, sources 151 and 153 emitting radiation of center wavelength $\lambda_{p1}$ and $\lambda_{p3}$, respectively, that is polarized perpendicular to some reference direction, and 152 and 154 radiation of wavelength $\lambda_{p2}$ and $\lambda_{p4}$, respectively, that is polarized parallel to the reference direction. Fibers 82 are of the polarization preserving type, couplers 81 are polarization selective couplers (see co-assigned U.S. patent application Ser. No. 737,257, filed May 23, 1985 by A. Ashkin et al, now abandoned), and coupler 80 is of the previously referred-to wavelength dependent type.

Those skilled in the art will appreciate that the coupling of pump radiation onto transmission fiber can be accomplished in a variety of ways, and that still other wayss to achieve this will undoubtedly be discovered in the future. All possible ways for coupling the pump radiation from the multiplicity of sources according to the invention are contemplated to be within the scope of the invention.

Although the use of multiple co-located pump sources is currently preferred by us, it will be appreciated that the invention can also be practiced with a broadband source whose output meets the intensity criterion. For instance, a solid state diode could be used as such a broadband source, provided that means for efficiently coupling its output to a single mode optical fiber can be devised.

In an exemplary embodiment, the optical fiber transmission channel consists of polarization maintaining dispersion shifted silica-based fiber having a loss of 0.18 dB/km at 1.56 μm and of 0.29 dB/km at 1.46 μm, a dispersion of 2ps/nm km, an effective core area of 25 (μm)$^2$, and has a length of 2200 km. A mode-locked laser produces bandwidth limited pulses of $\lambda = 1.56$ μm. The pulses are coupled into the fiber, the laser being adjusted such that the coupled-in pulses have a peak power of 3 mW, are substantially of sech-shape, and have a pulse width of 25 ps. The pulses thus are fundamental (N=1) solitons in the fiber. At intervals of about 40 km along the fiber are located pump radiation injection points. At each of these points is located a battery of ten semiconductor laser pump radiation sources, with center wavelengths substantially regularly spaced throughout the wavelength interval 1.44 to 1.48 μm. The sources have an average halfwidth of 20 nm, and typically emit in about 10 modes. The total pump power coupled into the fiber at each injection point is 40 mW, with the pump power in the fiber core everywhere being substantially below 1.0 mW (with the intensity everywhere being substantially below 0.04 mW/(μm)$^2$) for any wavelength region in the pump radiation spectrum that is equal to the Brillouin linewidth in this fiber, approximately equal to 18 MHz. The cw pump radiation is bidirectionally coupled into the fiber by means of a grating and a wavelength-dependent coupler. The Raman gain of the signal pulses over the 40 km amplifier spacing essentially equals the signal loss over this distance, resulting in stable transmission of the soliton pulses, with an error rate $< 10^{-9}$/bit achievable for bit rates up to 5 Gbit/sec. At the receiving end of the system, the pulses are detected by conventional means.

In the soliton-based transmission system depicted in the example above, the present invention affords the following advantages described below.

Net system gain would no longer be subject to the vagaries of wandering relative polarizations of the pump and the transmitted signals.

A well-maintained (fixed) polarization results in a significant reduction in the required pump power (by a factor of 2 over systems in which the pump and signal polarizations would vary over all possible relative polarizations). A well-maintained (fixed) polarization would held in reducing the number and/or cost of pump lasers. Also, a fixed polarization would tend to eliminate the effects of varying relative signal/pump polarization on the pulse arrival time. That is, we have found in our first experiments on the soliton system, that if the pump is pulsed, a "collision" between a soliton and a co-propagating pump pulse has the potential to produce a net shift in frequency and in velocity of the soliton when the nonlinear interaction between the two pulses varies over the duration of the collision. Since the nonlinear interaction depends on the stochastically varying polarizations of the pump and signal, the net result is a jitter in pulse arrival times. It should be noted that this effect requires both the variable polarization and pulsing of the pump. Elimination of the variation in polarization would then tend to eliminate the timing jitter, even in the presence of time variation (pulsing) of the pump.

A well-maintained polarization eliminates "polarization dispersion". That is, in ordinary fiber, the signal tends to split into two orthogonally polarized components, each tending to have a different arrival time, due to the different propagation constants of the two polarizations. The effect tends to degrade information in an obvious way, and it can seriously limit the capacity of ordinary systems. Although solitons tend to resist this effect (when the change in index induced by the solitons is greater than the fiber birefringence), it is not guaranteed that they can do so under all possible conditions. But note that the use of a single, well defined polarization for transmission of the signal allows the polarization dispersion effect to be avoided altogether.

The use of fixed and well defined polarization would also lift the restriction that auxiliary devices, such as fiber directional couplers and the like, must have polarization independent properties. It would then also allow the use of polarization selective devices, not normally even considered for the "unpolarized" system, and thus increase the range of useable fiber devices.

What is claimed is:

1. An optical fiber communications system with Raman amplification, the system comprising first means for generating first electromagnetic radiation of wavelength $\lambda_O$, a length of polarization maintaining optical fiber having a core and a cladding, detector means for detecting the first radiation, and means for coupling the first radiation into the optical fiber at a first fiber location, the coupled-in first radiation guided in the fiber to a second fiber location that is spaced apart from the first fiber location, at least some of the coupled-in first radiation emitted from the fiber at the second fiber location and detected by the detector means;

second means for generating second electromagnetic radiation in a predetermined polarization related to a desired signal polarization mode for the first radiation in the polarization maintaining optical fiber, associated with the second radiation being a second radiation spectrum;

means for coupling the second radiation into the polarization maintaining optical fiber at a third fiber location that is intermediate the first and the second fiber locations, said means for coupling causing said second radiation to propagate in a direction opposite to that of said first radiation in said polarization maintaining optical fiber; and the second means comprises a second radiation source selected to result in a second radiation spectrum having a width greater than the Brillouin linewidth of the optical fiber, and further selected such that the intensity of second radiation in the fiber at any wavelength $\lambda_p$ is less than a critical intensity $I_c$.

2. Communications system of claim 1, wherein the second means comprises at least an i'th and a j'th second radiation source, associated with each second radiation source being a center wavelength and a spectral width, the i'th and j'th second radiation sources selected such that the center wavelengths of the i'th and the j'th second radiation sources differ by at least about the spectral width of the i'th second radiation source.

3. Communications system of claim 2, wherein at least the i'th and the j'th second radiation sources are semiconductor lasers.

4. Communications system of claim 2, wherein the first radiation is pulsed radiation, and the first radiation coupled into the optical fiber forms soliton pulses in the fiber.

5. Communications system of claim 2, wherein the polarization maintaining optical fiber is silica-based optical fiber, $\lambda_O$ is in the range 1.2–1.6 μm, the second radiation spectrum contains a wavelength $\lambda_p$ that is about 0.1 μm shorter than $\lambda_O$, and the intensity of second radiation in the fiber at any wavelength in the second radiation spectrum is less than 0.04 mW/(μm)².

6. Communications system of claim 1, wherein the first radiation is pulsed radiation, and the second radiation is cw radiation.

7. An optical fiber communications system with Raman amplification, the system comprising
   first means for generating first electromagnetic radiation of wavelength $\lambda_O$, a length of polarization maintaining optical fiber having a core and a cladding, detector means for detecting the first radiation, and means for coupling the first radiation into the optical fiber at a first fiber location, the coupled-in first radiation guided in the fiber to a second fiber location that is spaced apart from the first fiber location, at least some of the coupled-in first radiation emitted from the fiber at the second fiber location and detected by the detector means;
   second means for generating second electromagnetic radiation in a predetermined polarization related to a desired signal polarization mode for the first radiation in the polarization maintaining optical fiber, associated with the second radiation being a second radiation spectrum;
   means for coupling the second radiation into the polarization maintaining optical fiber at a third fiber location that is intermediate the first and the second fiber locations, said means for coupling causing said second radiation to propagate in a direction opposite to that of said first radiation in said polarization maintaining optical fiber from said third fiber location to said first fiber location, said means for coupling also causing said second radiation to propagate in a direction similar to that of said first radiation in said polarization maintaining optical fiber from said third fiber location to said second fiber location; and the second means comprises a second radiation source selected to result in a second radiation spectrum having a width greater than the Brillouin linewidth of the optical fiber, and further selected such that the intensity of second radiation in the fiber at any wavelength $\lambda_p$ is less than a critical intensity $I_c$.

8. Communications system of claim 7, wherein the second means comprises at least an i'th and a j'th second radiation source, associated with each second radiation source being a center wavelength and a spectral width, the i'th and j'th second radiation sources selected such that the center wavelengths of the i'th and the j'th second radiation sources differ by at least about the spectral width of the i'th second radiation source.

9. Communications system of claim 8, wherein at least the i'th and the j'th second radiation sources are semiconductor lasers.

10. Communications system of claim 8, wherein the first radiation is pulsed radiation, and the first radiation coupled into the optical fiber forms soliton pulses in the fiber.

11. Communications system of claim 8, wherein the polarization maintaining optical fiber is silica-based optical fiber, $\lambda_O$ is in the range 1.2–1.6 μm, the second radiation spectrum contains a wavelength $\lambda_p$ that is about 0.1 μm shorter than $\lambda_p$, and the intensity of second radiation in the fiber at any wavelength in the second radiation spectrum is less than 0.04 mW/(μm)².

12. Communications system of claim 7, wherein the first radiation is pulsed radiation, and the second radiation is cw radiation.

13. An optical fiber communications system with Raman amplification, the system comprising
   first means for generating first electromagnetic radiation of wavelength $\lambda_O$, a length of polarization maintaining optical fiber having a core and a cladding, detector means for detecting the first radiation, and means for coupling the first radiation into the optical fiber at a first fiber location, the coupled-in first radiation guided in the fiber to a second fiber location that is spaced apart from the first fiber location, at least some of the coupled-in first radiation emitted from the fiber at the second fiber location and detected by the detector means, said first radiation is pulsed radiation to form soliton pulses in said polarization maintaining optical fiber;
   second means for generating second electromagnetic radiation in a predetermined polarization related to a desired signal polarization mode for the first radiation in the polarization maintaining optical fiber, associated with the second radiation being a second radiation spectrum;
   means for coupling the second radiation into the polarization maintaining optical fiber at a third fiber location that is intermediate the first and the second fiber locations; and
   the second means comprises a second radiation source selected to result in a second radiation spectrum having a width greater than the Brillouin linewidth of the optical fiber, and further selected such that the intensity of second radiation in the fiber at any wavelength $\lambda_p$ is less than a critical intensity $I_c$.

\* \* \* \* \*